United States Patent [19]

Grant

[11] Patent Number: 4,969,495
[45] Date of Patent: Nov. 13, 1990

[54] DIRECT CONDENSATION REFRIGERANT RECOVERY AND RESTORATION SYSTEM

[76] Inventor: David. C. H. Grant, One Walnut La., Selbyville, Del. 19975

[21] Appl. No.: 371,785

[22] Filed: Jun. 27, 1989

[51] Int. Cl.$^5$ ............................................. F25B 45/00
[52] U.S. Cl. ...................................... 141/98; 141/82; 141/85; 141/198; 62/149; 62/292
[58] Field of Search .................... 141/69, 82, 98, 85, 141/198; 62/149, 174, 77, 84, 85, 292, 474, 475

[56] References Cited

U.S. PATENT DOCUMENTS

| | | | |
|---|---|---|---|
| 3,487,656 | 1/1970 | Grant | 62/174 |
| 3,643,460 | 2/1972 | Garland | 62/174 |
| 3,699,781 | 10/1972 | Taylor | 62/474 |
| 4,285,206 | 8/1981 | Koser | 62/149 X |
| 4,441,330 | 4/1984 | Lower et al. | 62/149 |
| 4,476,688 | 10/1984 | Goddard | 62/149 |
| 4,646,527 | 3/1987 | Taylor | 62/85 |
| 4,805,416 | 2/1989 | Manz et al. | 62/292 |
| 4,809,515 | 3/1989 | Houwink | 62/149 |
| 4,862,699 | 9/1989 | Lounis | 62/84 |
| 4,878,931 | 11/1989 | Grant | 62/17 |

OTHER PUBLICATIONS

Perimeter Concept for Solvent Emission Control by David C. H. Grant presented at Int'l, Conf. on CFC and Halon Alternatives 10–11, Oct., 1989.

*Primary Examiner*—Henry J. Recla
*Assistant Examiner*—Casey Jacyna
*Attorney, Agent, or Firm*—Sughrue, Mion, Zinn Macpeak & Seas

[57] ABSTRACT

A refrigerant recovery and purification system particularly applicable to automotive air conditioning systems employs a centrifugal separator connected directly to the disabled automotive air conditioning system and which connects to a slack-sided accumulator and to a condenser chamber, all operating at near atmospheric pressure in a low pressure section. Oil and contaminants are separated by centrifugal action from the incoming refrigerant vapor stream and removed by gravity from the separator chamber. Condensing of the refrigerant vapor in the condenser produces a vacuum pressure for causing vapor to flow from the slack-sided accumulator to the condenser. A conventional refrigeration system supplies refrigerant liquid under pressure to a first evaporator coil within the condenser. The conventional refrigeration system also supplies high pressure liquid refrigerant to a second evaporator coil surrounding a liquid receiver connected by a conduit in series with the condenser and the accumulator. Condensed liquid refrigerant from the condenser flows to the liquid receiver by gravity. Periodically the liquid receiver is pressurized to drive condensed contaminant-free liquid refrigerant to a liquid refrigerant storage tank. Check valves within conduits connecting the condenser to the liquid receiver and the liquid receiver to the liquid refrigerant storage tank facilitate system operation and maintenance of desired pressures within low pressure and high pressure sections of the system.

12 Claims, 1 Drawing Sheet

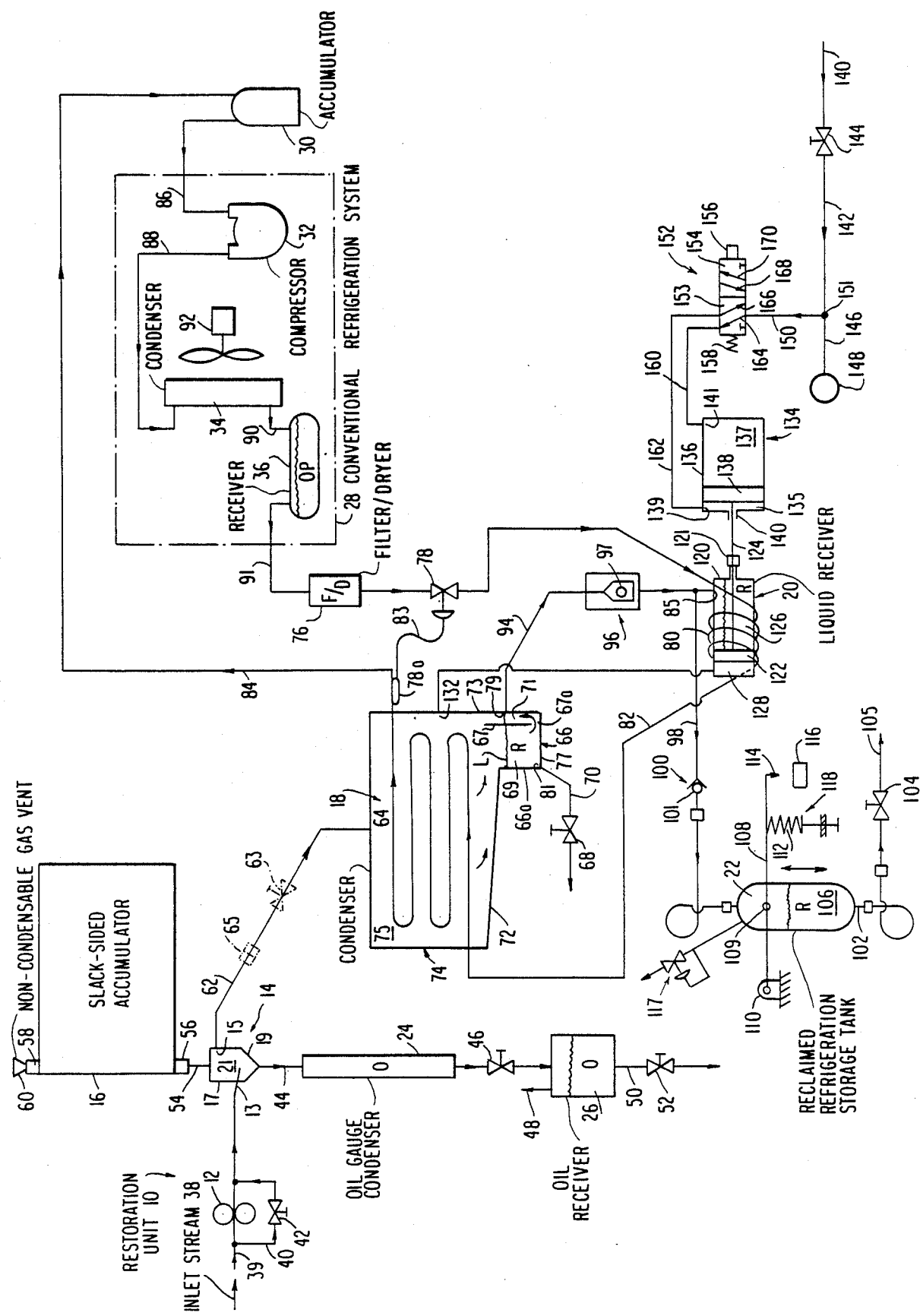

4,969,495

DIRECT CONDENSATION REFRIGERANT RECOVERY AND RESTORATION SYSTEM

FIELD OF THE INVENTION

This invention relates to the recovery and restoration for reuse of R-12 refrigerant, particularly for automotive air conditioning system servicing.

BACKGROUND OF THE INVENTION

The loss of refrigerant such as R-12 refrigerant from refrigeration systems, particularly during servicing of automotive air conditioning systems is the subject of much public concern at this time. A refrigeration service mechanic in servicing the air conditioning system normally vents the same. During venting, a significant amount of R-12 vapor is lost from the air conditioning system. There is a need, therefore, to provide a practical, simple, effective and low cost refrigerant recovery and restoration system which will allow the mechanic to vent an automotive air conditioning system with full recovery of the vapor contained therein, to provide a system which at least in part is relatively transportable to the situs of the automotive or like air conditioning or refrigeration system, which produces reclaimed refrigerant of equal quality in comparison to virgin refrigerant which is small in size, but which will be capable of operating with the volume of normal automotive air conditioning service operation.

Attempts have been made to produce an effective refrigerant recovery and/or disposal, purification and recharging system. Issued U.S. Patents representative of such known systems are:
U.S. Pat. No. 3,232,070;
U.S. Pat. No. 4,285,206;
U.S. Pat. No. 4,363,222;
U.S. Pat. No. 4,141,330;
U.S. Pat. No. 4,476,688;
U.S. Pat. No. 4,539,817;
U.S. Pat. No. 4,554,792;
U.S. Pat. No. 4,646,527; and
U.S. Pat. No. 4,766,733.

These Patents disclose as aspects of such refrigerant recovery systems the employment of components such as vacuum pumps, oil separators, condensers, liquid refrigerant receivers and accumulators. Unfortunately, the systems identified above are characterized by complexity and high pressure operation and are plagued with maintenance problems due particularly to the high pressure portions of the system.

It is therefore an object of the present invention to provide an improved, low cost, simple, essentially atmospheric pressure operated refrigerant recovery and restoration system which operates primarily as a direct condensation process, which has particular application to servicing automotive air conditioning systems, but is not limited thereto, and which may be advantageously employed in servicing home refrigerators or systems using R-12 as refrigerant, and which obviates the problems discussed above with respect to the known prior art.

BRIEF DESCRIPTION OF THE DRAWING

The single Figure is a schematic diagram of the improved, direct condensation refrigerant recovery and restoration system forming a preferred embodiment of the present invention.

DESCRIPTION OF THE PREFERRED EMBODIMENT

Referring to the drawing, the refrigerant recovery and restoration system or unit of the present invention is indicated generally at 10. The basic components of the system consist of a vacuum pump 12 (if needed), an inlet centrifugal separator 14, a slack-sided accumulator 16, a condenser 18 with integral water separator 66, a liquid receiver 20, a high pressure reclaimed refrigerant storage cylinder or tank 22, an oil gauge 24, an oil receiver 26, and a conventional refrigeration system 28.

The conventional refrigeration system typically employs, as shown, a suction accumulator 30, a compressor 32, refrigerant condenser 34, receiver 36, and a thermal expansion valve indicated generally at 78.

It is believed that the make up, operation and advantages of the refrigerant recovery and restoration system 10 may be best appreciated by a discussion of the components in order and their relationship to each other, leading to the discharge of reclaimed refrigerant from the refrigerant storage cylinder 22.

The refrigerant recovery and restoration system 10 has particular application to recovering, treating and providing reclaimed refrigerant R-12 from an automotive air conditioning or other refrigeration system. In that respect, a typical, fully charged automotive air conditioning system contains about 3 to 3.5 lbs. of refrigerant R-12. However, automobiles brought in for air conditioning servicing may contain much less refrigerant. Instead of simply venting the old refrigerant to the atmosphere at the time of service, the refrigerant inlet stream R-12, to be reclaimed, indicated generally by headed arrow 38 is vented into a tangential inlet 13 of an inlet section centrifugal separator 14. The inlet stream 38 passes through bypass valve 42 within bypass line 40 of inlet line 39, if the car's air conditioning system pressure is above atmospheric pressure. This permits the system being serviced to then be evacuated with a conventional vacuum pump such as vacuum pump 12 within line 39 upstream of the inlet centrifugal separator 14.

In the separation process, oil, liquid water (if any) and particulate matter are separated from the refrigerant vapor in the inlet centrifugal separator 14 which is of conventional form. The flow enters the vertical axis cylindrical casing 17 via tangential inlet 13. With the in-coming gas stream entering the casing 17 tangentially, a swirling motion is set up internally of the cylindrical casing 17 about its vertical axis with this motion centrifugally assisting gravity in the separation of oil, liquid refrigerant and particulates which fall by gravity into a conical bottom section 19 of the inlet centrifugal separator 14. The geometry of the inlet centrifugal separator 14 should be such that the velocity of the in-coming gas is as high as practical. The diameter of the inlet connection 13 should be restricted to the diameter of a conventional services gauge set (e.g., ⅜" O.D. tubing) or less. The diameter of the inlet chamber 21 must be small enough to generate centrifugal force, yet not allow mixing of the separated refrigerant vapor and the incoming gas. The diameter of the inlet chamber 21 should be in the range of 1-½" to 4".

The liquid refrigerant released is vaporized by the addition of heat from the room through the casing wall of the inlet centrifugal separator. The heavier material (oil and particulate matter) flows by gravity through the conical portion 19 of the separator 14 and through a line or tube 44 to oil gauge 24 by gravity. Throughout this description the term "line" or "tube" covers any conduit means accomplishing the desired fluid flow. Refrigerant vapor within the upper portion of inlet chamber 21 flows up through line 54 to inlet fitting 56 of the slack sided accumulator 16. The slack-sided accumulator is of bag form, preferably a flexible plastic film imperforate to refrigerant vapor at reasonable pressure (in this case at or near ambient pressure). The size of the accumulator whether in bag form or otherwise is commensurate with the in-coming volume of refrigerant vapor separated at separator 14 and available to the accumulator 16 through line 54. In this system, the system pressure is maintained, essentially at one atmosphere, since the slack sides of the accumulator offer no resistance to expansion of the internal accumulator chamber volume. The atmospheric pressure on the exterior of the accumulator therefore essentially matches the internal gas pressure during system operation.

The volume of 3 lbs. of R-12 refrigerant in the vapor state at one atmosphere and 70° F. is 6.3 cubic feet. The accumulator volume must be somewhat greater than the gas volume to maintain one atmosphere pressure after being filled from the gas from an automobile being serviced. Thus, the accumulator 16 volume should be greater than about 10 cubic feet for automotive service. The upper limit of accumulator volume can be determined by balancing the recovery capacity (pounds of refrigerant condensed per hour), the number of vehicles (or units) to be serviced in a given time, and the space available for the slack sided accumulator 16 or several accumulators of that type. Opposite to the side of the slack sided accumulator 16 bearing fitting 56 connected to line 54 is a similar fitting 58 which bears a non-condensable gas (NCG) vent 60. Fitting 58 is of a type permitting selective, periodic venting of the non-condensable gas accumulating within the top of the slack-sided accumulator 16 as shown in the system.

An outlet 15 is provided within the inlet centrifugal separator cylindrical casing 17 near its top and connects via line 62 to condenser 18. Line 62 opens therefore to condensing chamber 75, internally of condenser housing 74 forming chamber 75. Thus, the relatively heavy refrigerant gas (2.1 lbs. per cubic foot compared to 0.075 lbs. per cubic foot for air at one atmosphere pressure and 70° F.) is allowed to flow through line 62 into the condenser chamber 75, initially, by gravity.

At startup the chamber 75 is full of air. When refrigerant is introduced into the system the heavier refrigerant vapor drops, by gravity, into chamber 75 displacing the relatively lighter air.

After condensing begins, the volume of vapor within chamber 75 is reduced by the condensation of refrigerant vapor. This creates a negative pressure in chamber 75 which draws more vapor from the accumulator into the chamber 75. In this mode vapor flow into chamber 75 by "pressure differential" is the correct term. The size of the tubing connecting the accumulator 16 (via lines 54, 62) is a compromise. It should be large enough to avoid a high flow loss pressure drop, yet should be as small as possible to reduce the volume of non-condensable gas (NCG) within the system at start up. A tube or other conduit means of ¼" to 1-½' diameter should be adequate. The condenser 18 carries internally of housing 74 a condenser coil 64 of multiple turns which provides a surface area sufficient to effect the desired condensation of the relatively heavy R-12 refrigerant gas entering the condenser chamber 75 and contacting the exterior surface of the condenser coil 64 which, as illustrated, is of serpentine form.

The exterior surface of the tubing forming the coil 64 is maintained at a low temperature by the use of the conventional refrigeration system 28. The surface temperature must be below the boiling point of the R-12 refrigerant at one atmosphere pressure (−21.6° F. for R-12). The range of −22° F. to −40° F. is practical, although if a colder temperature (down to the freezing point of the refrigerant: −252° F. for R-12) is available, the recovery process will be enhanced. The condensing surface may be simple, as for instance a bare tube as schematically indicated, although that surface may be a plane surface or one of more complex shape, for example a finned tube or pierced fin heat exchanger. The condensing surface must be sized to allow the required amount of heat transfer to take place and, additionally, to hold a practical amount of water and/or R-12/water hydrate. Water, in whatever form, is retained on the heat exchanger surface provided by the condenser coil or tubing 64. A practical compromise is to size the condenser surface twice that required for just the condensation of the design amount of R-12 refrigerant vapor.

The volume of the inlet section or inlet centrifugal separator 14 chamber 21, the volume of the condensing chamber 75 and that of the tube 62 leading to the condensing chamber 75 from the inlet section chamber 21 should be minimized to reduce the amount of air in the system at start up. The air will be dislocated within the system to the accumulator, and will eventually be vented as non-condensable gas from the accumulator through vent 60 of fitting 58.

As a refrigerant R-12 vapor is condensed, the volume of gas in the condensing chamber 75 is reduced. This lowers the pressure within the condensing chamber 75 which, in turn, draws more vapor into the condensing chamber from the accumulator 16. Condensation will continue until all the vapor available to it is condensed or until the non-condensable gas (NCG) fraction of the gas entering the condensing chamber 75 gets high enough to stop the condensing process. This is calculated to be 121, 600 ppm (wt.) air in refrigerant R-12 at one atmosphere pressure, and −40° F. Venting of the non-condensable gas (NCG) from the accumulator 16 will then be required.

The condenser 18 includes an integral water separator 66 at the bottom of condenser casing or housing 74. The water separator may not be needed under some conditions. Since the solubility of water and refrigerant R-12 decreases with temperature and is in the range of 3.5 to 1.7 ppm (wt. for the temperature range of the process, water above the solubility capacity of the refrigerant will come out of solution as liquid water during condensation. Since the temperature is below +32° F. the water will either freeze as water ice or will form a water/fluorocarbon hydrate, a loose molecular bonding of water and refrigerant molecules, about 20% (wt.) R-12. Hydrate is a white, frost-like structure that will decompose into water and refrigerant vapor on defrost. A conventional, gravity-type, water separator is employed using an oblique bottom wall 72 of casing 74 as a drain leading to a well 66a, the principal component of the water separator 66. A water separator separate from the condenser 18 may be employed in the system. Within the well 66a, there is provided a vertical wall 67 separating the well into a large initial chamber 69, to the left, and a much smaller volume, right side chamber 71 to the opposite side of vertical wall 67 and defined partially by the right side end wall 73 of condenser housing 74. The vertical wall 67 has a hole as at 67a within the bottom of the same, or the lower edge of vertical wall 67 is raised slightly above the bottom wall of the well 66a such that separated, condensed refrigerant vapor R accumulates at the level of outlet 79 within vertical end wall 73 of housing 74, opening to a tube or line 94 connecting the condenser 18 to liquid receiver 20.

Further, an outlet 81 at the very bottom of the well 66a connects to drain line 70 within which is mounted a drain control cut off valve 68. Thus, conventional gravity-type water separation follows the R-12 condensation step to insure no ice or hydrate can be carried with the liquified refrigerant R into the liquid receiver 20 via line 94. A momentary hold of the liquid refrigerant R in the water separator 66 for a period of time of 3 to 5 minutes should be adequate to insure the desired water separation.

Conditions during recovery permit gravity feed of the separated refrigerant R-12 through line 94 via hole or opening 79 upon accumulation thereof in chamber 71 to level L. The water drain valve 68 from the water separator remains closed during recovery operation. Note, the temperature in the water separator is well below +32° F. (water freezing point) all the time recovery is taking place. Any water or hydrate will be in the form of a low density solid and will be either on the condenser 64 surface or will float on top of the liquid refrigerant in the water separator. Water ice is much less dense than refrigerant liquid.

The purpose of drain valve 68 is to remove water from the water separator. This can only occur after defrost and the melting of both water ice and hydrate. At this time there is no liquid refrigerant R within the water separator. All of it has been vaporized. The volume of vapor not contained by chamber 75 has been displaced up into the accumulator 16. Water separation, for example, could occur in less than 3 minutes.

On defrost, the entire assembly is allowed to warm up to room temperature. During this process the liquid refrigerant in the water separator is evaporated and the resultant refrigerant vapor goes up into the accumulator. Ice and hydrate melt. The liquid water accumulates in the bottom of the water separator and can then be drained off through drain valve 68.

The temperature of the liquified (condensed) refrigerant liquid R available to the liquid receiver 20 will be in the range of −22° F. to −40° F. falling by gravity to the bottom of the condensing chamber 75, flowing through the water separator well 66, passes into smaller chamber 71 where it flows via line 94 into the liquid receiver 20. The liquid receiver 20 takes the form of a horizontal axis cylinder 120 closed at both ends, having a port 85 at the top thereof for permitting the refrigerant to enter the liquid receiver chamber 126. Cylinder 120 is further provided with a reciprocable piston 122 sized to the interior of the cylinder 120 and being coupled via piston rod 124 through a suitable sealed fitting 121 at one end wall to a reciprocable piston 138 of power cylinder indicated generally at 134.

The power cylinder includes a cylindrical casing 136 within which the piston 138 reciprocates. Piston 138 therefore defines chambers 135, 136 with the cylindrical casing 136, these chambers being open by way of ports 139 and 141 to lines 160, 162 for selective coupling by way of a solenoid valve 152 to a source of air under pressure indicated generally by arrow 140, through lines 142, 150. Line 150 connects at 152 to a further line 146, leading to a pressure gauge 148. The solenoid valve 152 includes a solenoid 156 for shifting a valve spool 153 slidable within valve casing 154 to the left against the pressure of a biasing spring 158, otherwise the biasing spring 158 maintains the valve spool 153 in the condition illustrated schematically. As shown, the high pressure air from source or supply 140 passes through metering valve 144 in line 142 to chamber 137, via spool passage 164 and line 162 and port 141 displacing piston 138 to the left and, in turn, driving piston 122 of the liquid receiver 20 to its leftmost position, while chamber 135, via port 139 line 162 and passage 166 of the valve spool dumps to the atmosphere. Upon energization of the solenoid coil 156, the valve 152 shifts to the left, against the bias of spring 158 making a line connection via passage 170, between line 150, and 162 for pressurization of the chamber 135 to the opposite side of piston 138 of power cylinder 134 and via passage 168 and line 160 to dump chamber 137 to the atmosphere. In driving piston 122 to the right, the pressure within chamber 126 of the liquid receiver is increased to the extent where it closes ball 97 of ball check valve 96, sealing off line 94 from the water separator 66 to the liquid receiver 20. This permits the movement of recovered refrigerant liquid R in the liquid receiver 20, through check valve 100 to a high pressure, reclaimed refrigerant storage cylinder 22 for storage.

This check valve does not operate in the same fashion as a conventional check valve. The object is that the valve should remain open as the volume of chamber 126 is reduced until all the vapor has been returned through tube 94 back into chamber 75. This occurs since the ball 97 is more dense than the vapor.

After the vapor is expelled, liquid will rise up into check valve. Since the density of the ball 97 is less than the density of the liquid, it will float up inside the check valve 96 chamber and will seat in the top opening of the check valve blocking further flow through line 94 into chamber 75.

Since the power cylinder continues to drive receiver piston 122 to the right the pressure within receiver chamber 126 will rise. The liquid has no place to go until the pressure in chamber 126, line 98 and check valve 96 rises to meet the pressure in refrigerant cylinder 22.

At this time check valve 100 opens to admit recovered refrigerant flow into refrigerant storage cylinder 22.

After the transfer stroke is over piston 122 returns to its normal position at the right end of cylinder 20. When the pressure at check valve 96 drops to that of chamber 75, the ball will drop allowing vapor to be drawn onto chamber 126. Liquid will accumulate in chamber as the recovery process continues. After a predetermined time the cycle is repeated.

The refrigerant storage cylinder 22 is allowed to come to ambient temperature (50° F. to 120° F.). Its pressure will range from 47 to 158 psig. The refrigerant storage cylinder 22 is used to store restored refrigerant and to recharge the automotive (or other) refrigeration system under repair via line 105 and control valve 104. The reclaimed liquid refrigerant R is shown within the refrigerants storage cylinder 22 entering chamber 106 of that cylinder after passage through line 98 and through ball check valve 100. If the pressure within chamber 106 is in excess of that of line 98 upstream of the ball check valve, the ball 101 of check valve 100 will close.

From the drawing, it is apparent that it is necessary to chill the liquid receiver 20 to keep the refrigerant R in liquid form within chamber 126. If refrigerant R is allowed to boil in the liquid receiver, the vapor rising to reenter the condensing chamber 75 through port 85 and line 94 may block entry of the incoming liquid from the condenser water separator 66. The use of reflux to cool the liquid receiver 20 may be used (i.e., boiling liquid refrigerant R-12 in the liquid receiver 20), allowing the vapor to return to the condenser where it is recondensed, subcooled and returned by gravity to the liquid receiver 20.

In the illustrated embodiment, the liquid receiver is chilled by an evaporator coil 80 surrounding chamber 126 and being connected in the closed loop, conventional refrigeration system 28. In that respect, liquid refrigerant OP operating within that closed loop (not the refrigerant R, i.e., R-12 to be recovered), discharges from receiver 36 of the conventional refrigeration system 28 through line 91, leading to a conventional thermal expansion valve 78 after passage through the filter/drier 76. A temperature bulb 78a (or other sensor) measures the temperature of the vapor returning from condenser 18 via line 84 to the suction accumulator 30 of system 28. Thus, the flow of refrigerant from receiver 36 of the conventional refrigeration system 28 is metered to evaporator coil 80 surrounding the liquid receiver cylinder 120. That coil 80 is in series with evaporator coil 64 within condenser chamber 75 via line 82. Both coils function as evaporator coils, the first coil 80 maintaining the condensed refrigerant R within chamber 126 in that form, and preventing vaporization and return of vapor through line 94 to the condenser chamber 75, the second facilitating condensing of the to be reclaimed refrigerant R-12. As stated previously, additional heat is picked up by the refrigerant OP of the conventional refrigeration system in passing through coil 64, and in condensing the R-12 refrigerant R vapor from the slack-sided accumulator 16 into chamber 75 via line 62. The refrigerant OP now fully vaporized, returns to the suction side of compressor 32 via lines 84, 86 and suction accumulator 30. High pressure refrigerant OP vapor from compressor 32 passes via line 88 to the conventional refrigeration system condenser 34 where it is condensed and stored, at high pressure, in receiver 36 via line 90. This completes the conventional refrigeration system loop. Thus, the evaporator coil 80 chills the liquid receiver 20 sufficiently to maintain the R-12 refrigerant R in liquid form.

While the mechanical force means via piston 122 is employed in the illustrated embodiment through power cylinder 134 to increase the liquid cylinder pressure within chamber 126 to above the refrigerant storage tank 22 pressure, an alternative way to achieve this end is to close off the liquid receiver 22 from the recovery process via suitable valve or valves. There are alternative ways to cause the recovered refrigerant from the low pressure side to flow to the high pressure side. Also, variations of the air powered system disclosed may be readily made.

A cylinder of the type shown can be used as the liquid receiver. It can be driven, mechanically, to transfer the recovered refrigerant by a number of means, including the pneumatic system shown. Other systems could include the use of an electric motor driving a screw, cam or lever system that would cause the piston of the liquid receiver to move. The motion could be periodic or the reciprocating motion could be continuous.

A manually operated lever system may suffice.

Alternatively, an appropriate high pressure pump, such as a gear pump, or other positive displacement pump could be used to transfer liquid refrigerant to the storage tank.

A thermally Driven Transfer System in which a change in temperature is used to increase the pressure of the liquid receiver to above the pressure in the refrigerant cylinder may be employed. To do this one has to close the receiver off from the condenser, raise the temperature to, in the extreme case about $+125°$ F. to get the liquid to flow. The real problem is the time and energy needed to operate this cycle. It should be noted that chamber 128 connects to condenser chamber 75 through a line to port 132 within wall 73 of the condenser chamber housing 74. In either case, to allow the entry of liquid refrigerant into the liquid cylinder 22 and simultaneously allow vapor being displaced to escape back into the condensing chamber 75, ball check valve 96 is employed within line 94 upstream of the liquid cylinder 22. The diameter of ball 97 should preferably be at least $\frac{3}{8}''$ diameter. Further, the density of the ball 97 should be less than the density of the liquid refrigerant (specific gravity S.G.=1.49 at $-22°$ F.). Thus, when the mechanical force is applied via piston 128 which causes the volume of the cylinder chamber 126 to decrease, the vapor in the liquid receiver cylinder chamber 126 will be driven past the ball 97 of ball check valve 96 back up through line 94 into condenser chamber 75 of condenser 18. When the liquid level of refrigerant R-12 within chamber 126 of the liquid receiver 20 rises to the ball 97, the ball 97 will float up until it is seated at the top of its travel. At this point, further application of mechanical force via piston 122 to the liquid refrigerant R within chamber 126 of the liquid receiver 20 will cause the pressure in that liquid receiver cylinder chamber 126 to increase until it overcomes the refrigerant cylinder 22 pressure displacing the ball 101 of ball check valve 100 to the left, and permitting flow through line 98 into the chamber 106 of the refrigerant cylinder 22.

The cold liquid refrigerant R entering the refrigerant storage cylinder or tank chamber 106 will reduce the pressure within chamber 106 of the refrigerant storage cylinder. This pressure, however, will again rise as the refrigerant storage cylinder temperature equalizes with ambient. The refrigerant storage cylinder 22 is the only high pressure vessel of the recovery system. As such it must be protected from overpressure, and filling liquid full by a combination of a pressure release valve 117 and level control switch illustrated generally at 118. A lever 108 pivots at one end to one side of the refrigerant storage cylinder 22 and extends around and beyond that cylinder on a yoke which couples to cylinder 22 via pins 109. The lever 108 terminates to the opposite side of tank 22 in a moveable contact 114. The lever 108 and cylinder is spring biased upward by a tension coil spring 112 such that normally open contacts 114, 116 of the level switch 118 shut the system down when the refrigerant storage cylinder 22 reaches the 80% fill level, at which point the liquid refrigerant R causes the tank 22 to compress spring 112 to the extent of closing contacts 114, 116. For purposes of simplicity, the electrical contact circuit including the level control switch 118 and the compressor 32 of the conventional refrigeration system is not shown. However, it should be kept in mind that the moving elements of the system are essentially those of the liquid receiver and the conventional refrigeration system 28, and specifically within the broken line box representation 28 of the main components of that system (other than the two evaporator coils 80, 64 and the TX thermal expansion valve 78). Additionally, the control circuit level sensing switch 118 indicates a control of the operation of the solenoid valve 152 resulting in a drive of the piston 122 to its full leftmost position in liquid receiver cylinder 120 and a reduction in pressure of chamber 126 of liquid receiver 20 to ambient upon system 10 shut down.

There are a variety of practical ways to control the power cylinder control valve 152 (or other mechanical means used to transfer the recovered liquid to the refrigerant storage cylinder 22).

One could run a pump periodically or use a lever system, operating continuously, to achieve the same effect.

Certainly, the high level switch 118 on the refrigerant cylinder must stop any further transfer of liquid refrigerant R into that cylinder. The electrical control system is arranged to do that. Cylinder 22 is mounted on lever 108 such that an increase in weight of the cylinder and its contents will tend to overcome the opposing spring force. Eventually, as more liquid is added, the level switch will be tripped and the entire system will be shut down (including the return of the piston 122 in the liquid receiver 20 to its normal or starting position).

It should be appreciated that the liquid oil O separated in the centrifugal separator 14 of the inlet section has its vapor pressure so low at 70° F. that the oil vapor in the refrigerant vapor stream is undetectable. As a result, condensed liquid refrigerant R in the water separator 66 will be virtually free of oil. Control or cut off valves 46 and 52 are selective, the opening of valve 46 permits the oil O within oil gauge 24 to pass by gravity from the oil gauge to the oil receiver. The oil receiver includes a vent 48 for venting vapors therein, above the level of oil O within that receiver. An oil drain line 50 includes a selectively openable cut off valve 52 for periodically draining of the oil accumulating Within oil receiver 26.

It should further be noted that some of the entering non-condensable gas (NCG) will flow into the accumulator 16 and will stay there because it is lighter than the refrigerant vapor. Any NCG that finds its way to the liquid receiver 20 can go no further in the recoVery path since only liquid is allowed to pass into the refrigerant cylinder 22. The refrigerant cylinder 22 is fully evacuated at start up and remains full of R-12 vapor thereafter. As may be appreciated from the description of the refrigerant recovery and restoration system 10, a principal novel feature of the invention is the use of an inlet accumulator of the "slack sided type" to capture the refrigerant vapor extracted from the automotive (or other) refrigeration system being serviced and providing the inlet stream 39. This slack-sided type accumulator adequately contains the refrigerant gas prior to recovery at near atmospheric pressure and maintains atmospheric pressure of the recovery process. As a result of this, a number of benefits are obtained by the use of the slack sided accumulator 16.

First, the vapor pressure of the refrigeration oil is so low at ambient pressure and temperature that the oil vapor accompanying the refrigeration vapor into the recovery condenser 18 is so small as to be undetectable. The oil O is left in the inlet section 11 consisting essentially of inlet centrifugal separator 14 where it is collected within the oil gauge 24 through the outlet line 44 at the bottom of the separator 14.

Secondly, since only vapors are allowed to flow to the recovery condenser 18, particulate materials which are heavier than the refrigerant gas separate by gravity and the centrifugal action of the inlet chamber 21 of the separator 14 and are left behind with the oil O for passage into the oil receiver 26.

Thirdly, the acid follows the water, thus since there is so little water in the recovered refrigerant R at the water separator 66, there will be essentially no acid in the recovered refrigerant R.

The following data evidences a favorable comparison of recovered refrigerant quality (calculated) between that (EPA SPEC) meeting the EPA specifications and that effected via the claimed invention (the column to the far right under the designation A-12RS SPEC). The EPA SPEC is from the

| Item | EPA Ad Hoc Committee | |
|---|---|---|
| | EPA SPEC | A12RS SPEC |
| Moisture | 15 ppm (wt) | <4 ppm |
| Oil | 4,000 ppm (wt) | undetectable |
| NCG | 0.15 gm/lb | virtually nil |
| Acidity | not specified | virtually nil |
| Particulates | not larger than 15 microns | virtually nil |

A discussion was had previously of the oil and non-condensable gas content. Further, as to acidity, similar to the virgin R-12 refrigerant, it is expected that that the reclaimed R-12 refrigerant via the system 10 of this invention will have no acidity problem; however, if one is encountered, it is proposed to add a neutralization bed to the system to remove the acidity.

As to particulates, since the process is essentially one of distillation, the particulates are separated with the oil in the centrifugal separator and are not carried over into the recovery section, starting with the recovery condenser 18. With a clean system, the size and quantity of particulates in the recovered R-12 refrigerant should be as good or better than that of virgin R-12.

Additionally, with respect to the claimed invention, with the oil O and particulate matter flowing into the oil gauge 24 where the volume can be measured prior to feeding the separated oil to the oil receiver 26, this guides the mechanic later when the automobile's air conditioning system is recharged. Regarding the recovery section, since the condensing surface (of coil 64) of the condenser 18 is below the boiling point of R-12 at ambient pressure, the refrigerant vapor at the condenser surface is condensed back to the liquid state and is chilled to the surface temperature. The collapsing vapor within chamber 75, reduces the pressure in chamber 75 and draws additional R-12 vapor from the interior of the slack-sided accumulator via lines 54, 62. Under some operating conditions, it is expected that the water separator temperature may rise to −22° F. in the water separator 66 due to heat gain from the ambient. When that happens, some of the R-12 refrigerant will be vaporized. That vapor rises into the condenser chamber 75 and will be recondensed. This reflux process will keep the water separator at −22° F. or below. With the water solubility of R-12 at −22° F. being 3.4 ppm, the highest water content for recovered R-12 refrigerant by this process is 3.4 ppm (wt.). The evaporator coil 80 of the liquid receiver 20 maintains the recovered liquid refrigerant R in chamber 126 at the range of −22° F to −40° F.

The advantages of the refrigerant recovery and restoration system 10 as described above are numerous:

The system allows the mechanic to vent an automotive air conditioning or other refrigeration system just as he does now, except the vapor is contained in the slack-sided accumulator 18 until it is recovered.

The accumulator is sized to accommodate several "cars worth" of vapor, while the relatively small recovery system works continuously.

The slack sided accumulator keeps system pressure at ambient, simplifying unit construction and virtually eliminating loss of refrigerant through defective seals or other problems associated with high pressure system operation, a characteristic of known recovery and restoration systems.

The system produces reclaimed refrigerant of equal or better quality compared to virgin refrigerant. This reliable high quality is a function of the process itself and does not require additional monitoring or instrumentation to insure quality end product.

The refrigerant recovery and restoration system of the present invention is simple to operate by turning it on or turning it off. The moving parts are concentrated in the liquid receiver and conventional refrigeration system or package, so there is little maintenance required.

Further, recovery and restoration system provides a small, compact unit sized to keep up with the volume of a normal automotive air conditioning service operation. Additionally, it involves a basic process, the distillation of a liquid which is conventional and in long practice. The system uses known principles of centrifugal separation of oil and particulates, yet its application on the inlet side and in conjunction with a slack sided accumulator facilitates refrigerant recovery at low cost and in a highly effective manner. Bladders or other types of slack sided accumulators have been used on dry cleaning equipment to accommodate the change in dry cleaning solvent vapor volume between the "cleaning" step and the "drying" step, under this set up, when dry there is air in the machine, while during cleaning the air is displaced with vapor. The bladder prevents the loss of the air with its inevitable solvent content. The invention, therefore, takes a known structural element, presents it uniquely to a refrigerant recovery and restoration system, resulting in a relatively small package or unit, one which works continuously, one which may be used to recover vapor that is fed in "slugs" and which is the key in allowing the condensation process of the system 10 to be practiced.

The slack sided accumulator may be in the form of a three-sided, seamed bag by folding over a rectangular sheet of flexible gas impervious plastic film such as a MYLAR ® or plastic coated fabric. Alternatively, the slack sided accumulator may be of pillow form, sealed about all four edges between top and bottom thin flexible sheets. The pillow may be formed with integral tubes at the top and bottom, with a thermal welded seam about all edges. As such, the three-sided bag, pillow, or pillow with integral tube construction permits a flat configuration which, when empty, minimizes the content of non-condensable gas (NCG) on system start up. The accumulator may take other forms such as a blow molded bellows, with corrugated side walls, a single accordion fold formed of MYLAR or other film or coated fabric between front and rear or top and bottom flat sheets. Where the accumulator is of the bladder type, a cylindrical side wall of thin flexible film may be coupled at the bottom and top to annular disks of rigid material, and with the upper disk being appropriately weighted with the bladder vertically oriented and within a cylindrical well such that the weight forms a downward thrust on the captured gas internally, maintaining the refrigerant vapor under controlled low pressure storage within the bladder interior. The accumulator may be directly coupled to the top of the vertically oriented cylindrical centrifugal separator 14, or a line connected as via line 54, in the embodiment of the illustrated Figure.

Further, it is the condensation or distillation process which produces the essential product purity. Product purity, in turn, then is responsible for the basic units simplicity, low cost and provides a system for wide spread use to prevent atmospheric emission of CFC-12 (R-12).

By way of the slack sided accumulator, there is a natural separation of the R-12 vapor and the non-condensable gas that occurs within the accumulator due to differences in density. While there is some mixing, there is also some separation of air and vapor and the non-condensing gas resides in the accumulator 16, allowing periodic venting without significant R-12 vapor loss during such venting via the vent 60.

The system permits the inlet section to be physically separated from the recovery section with the separation occurring at line 62, thus the R-12 vapor can be captured at one physical location and recovery take place at a later time at another location. Further, vapors from a number of automobiles can occur at separate locations with recovery taking place at a central location after filling of the slack-sided accumulator 16 at a series of such locations in the servicing of a number of vehicles. It should be appreciated that there are two basic aspects to the present invention. The first resides in the realization that the slack sided accumulator 16, along with the inlet centrifugal separator 14 form an inlet section 11, which may be readily transported from vehicle to vehicle and then coupled by a line 62 to condenser 18 upon accumulation of a given volume of separated refrigerant vapor after the contaminant removal by centrifugal action within the inlet s centrifugal separator 14. In that respect, line 62 may incorporate a suitable cut off valve 63 indicated in broken lines as an added element, along with a suitable disconnect coupling 65 for disconnecting two portions of line or conduit means 62.

The second aspect of the invention is arrangement of components within a low pressure section or side of the restoration unit 10, and that of a high pressure section or side. Specifically the low pressure section, components consist basically of the inlet centrifugal separator 14, the slack-sided accumulator 16, condenser 18, along with its water separator 66, if needed or desired and liquid receiver 20. The high pressure components of the restoration unit 10 involve principally the reclaimed liquid refrigerant storage cylinder or storage tank 22, and the power cylinder 134. Ball check valves 96 and 100 effectively segregate the elements of the low pressure section from the high pressure section of the refrigerant recovery and restoration system 10 selectively depending on pressures within chamber 126 of liquid receiver 20 and 106 of storage tank 22.

In a typical operation, the refrigerant recovery and restoration system 10 is connected to a disabled refrigeration unit of an automobile, home refrigerator unit or the like, providing an inlet stream 39 of contaminated refrigerant which flows through line or conduit means 38 to the tangential inlet 13 of the inlet centrifugal separator 14. Since the inlet centrifugal separator operates at near atmospheric pressure through the utilization of the slack sided accumulator 16, as indeed do all elements of the low pressure section, slack sided accumulator 16, condenser 75 and, (in the absence of pressurization) by passage through line 94 and ball check valve 96, the liquid receiver 20 itself. Further, these units 16, 18 and 20 are series-coupled and positioned in vertical descending order, causing gas pressure differential flow of the accumulated refrigerant vapor from inlet stream 39 and from the accumulator 16 via the inlet centrifugal separator chamber 21 to condenser chamber 75 for condensing the refrigerant vapor; and condensed refrigerant R-12. passage through water separator sump or well 66a, via gravity through line 94 and open ball check valve 96 to the interior of the liquid receiver 20. Due to tangential entry and whirling flow of the inlet gas stream, and the vertical orientation of the inlet centrifugal separator chamber 21 and the connection to the slack-sided accumulator 16 via conduit means 54, the oil and particulate matter separate by centrifugal force and gravity pass through line 44 to oil gauge 24 and then via cut off valve 46, to the oil receiver 26. Oil may be periodically drained from the oil receiver by control of cut off valve 52 within line 50 opening to the bottom of the oil receiver. Assuming that the drain from the disabled refrigeration system has occurred at some distance from the system 10 components comprising condenser 18, liquid receiver 20 and reclaimed refrigerant storage tank or cylinder 22, after reconnection by coupling 65 between the two sections of line 62 upstream and downstream of shut off valve 63, opening of valve 63 permits flow of accumulated refrigerant vapor from the slack-sided accumulator 16 to condenser chambers 75. Further, under operation of the conventional refrigeration system 28 with the evaporator coil 64 within condenser 74 receiving expanding liquid refrigerant from receiver 36 of the conventional refrigeration system the condensation of the refrigerant vapor entering condenser chamber 75 significantly reduces the pressure therein. This causes a suction effect to take place between condenser chamber 75 and the slack sided accumulator 16. The liquified refrigerant forming on the exterior surface of the evaporator coil 64 drops therefrom and moves down the inclined bottom wall 72 of the condenser housing 74 to well 66a along with condensed and frozen water vapor. Gravity separation between the refrigerant R and the frozen water takes place within the water separator well 66a and the liquid refrigerant R reaching the level of port 79 flows through conduit 94 to the liquid receiver chamber 126 as long as the pressure within the chamber 126 is sufficiently low relative to that of condenser chamber 75 to permit that action. Accumulated liquid refrigerant R within liquid receiver 20 is pumped periodically from the chamber 126 by pressurizing chamber 135 from the high pressure air supply source 140 via shut off valve 144 by changing the position of the solenoid valve spool 153 from that shown in the drawing. Control is effected by energization of the solenoid coil 156, shifting the valve spool 153 to the left against the bias of spring 158, the effect of which is to connect branch line 150 to line 162 and causing the flow of high pressure air into chamber 135 to the left of piston 138 of power cylinder 134. This shifts piston 122 in the liquid receiver to the right, pressurizing chamber 126 of the receiver. When the pressure reaches a sufficient level, above that of chamber 106 within the reclaimed refrigerant storage tank or cylinder 22, flow of liquid refrigerant is initiated from liquid receiver chamber 126 through ball check valve 100 to chamber 106 of the refrigerant storage tank 22. In the initiation of operation of the recovery system 10, the conventional refrigeration system 28 operates through the thermal expansion valve 78 to insure flow of liquid refrigerant under pressure through the loop including the thermal expansion valve 78, evaporator coil 80 about the liquid receiver 20, and the evaporator coil 64 within condenser 18, which is in series therewith. The thermal bulb 78a contacting the vapor return line 84 at the exit side of the condenser housing 74 controls the passage of liquid refrigerant from receiver to evaporator coils 80 and 64. Periodically, by control of cut off valve 104 the reclaimed refrigerant is drained from the bottom of reclaimed refrigerant storage tank 22, which may be selectively returned to the disabled refrigeration system providing the inlet stream 39, after repair is made to that disabled system.

When the reclaimed liquid refrigerant R rises to the 80% level of chamber 106, lever 108 driven by the weight of the refrigerant cylinder 22 pivots counterclockwise against bias spring 112, closing the circuit between contacts 114, 116 to shut down system 10, including termination of the energization of solenoid valve 152 and returning the valve to the position shown. They cause the air supply 140 to pressurize the right side chamber 137 of power cylinder 134 to drive the piston 122 to its furthermost left side position within liquid receiver cylinder 120 to depressurize chamber 126 of the liquid receiver. The liquid receiver chamber 126 should be at atmospheric pressure upon start up of the refrigerant recovery and restoration system 10 in terms of operation of the liquid receiver evaporator coil 80 and the condenser evaporator coil 64.

While the refrigerant recovery and restoration system employing the direct condensation process has particular use in the recovery and restoration of R-12 refrigerant for reuse, specifically for automotive air conditioning servicing, it is possible to apply the system 10 to common lower boiling refrigerants, for instance, R-11 and R-113 refrigerants. It may not be practical, due to the very low recovery temperatures necessary, to recover R-22 or R-502. For R-22 condensing temperature must be in the range of $-50°$ F. to $-60°$ F. The lower temperature limit for inexpensive commercial refrigeration package today is about $-40°$ F. While the reclaimed refrigerant storage cylinder or tank 22 is described as the only high pressure vessel of the system, it must be appreciated that the liquid receiver 20 and its connecting conduit means 98, check valve 100 and line 94 back to check valve 96 must withstand pressures experienced in transfer of accumulated liquid refrigerant R from the liquid receiver 20 to the reclaimed refrigerant storage cylinder or tank 22 under the pressures effected within liquid receiver chamber 126 by power cylinder 134.

While the description above is to a preferred embodiment and contains specific parameters and location and connection details, these should not be construed as limitations on the scope of the invention, and the system in the single Figure is exemplary only. The scope of the invention is determined not by the illustrated embodiment, but by the appended claims and their legal equivalents.

What is claimed is:

1. A refrigerant recovery and purification system for removing gaseous refrigerant from a disabled refrigerant unit, cleansing the refrigerant of contaminants, and converting the gaseous refrigerant to a liquid state for storage, said system comprising:
a low pressure inlet section;
a high pressure storage section;
said low pressure inlet section comprising:
an oil and refrigerant gas separator, including a separated oil removal means,
first conduit means for connecting an inlet of said separator to said disabled refrigerant unit,
a slack sided accumulator,
second conduit means connecting said separator to said slack sided accumulator for permitting free flow of separated, oil-free refrigerant gas to said accumulator from said separator for momentary storage at near atmospheric pressure,
a condenser,
third conduit means connecting said separator and said condenser in series, for causing flow of refrigerant vapor from the slack sided accumulator via said second and third conduit means to said condenser at low pressure differential.
an evaporator coil and said condenser connectable to a conventional operating refrigeration system for receiving a liquid refrigerant under pressure for expansion therein, said evaporator coil forming a condensing surface for condensing said refrigerant gas at near atmospheric pressure in said condenser,
a liquid receiver,
a reclaimed refrigerant storage tank,
fourth conduit means further connecting said liquid receiver in series with said condenser, downstream thereof and further including a check valve between said condenser and said liquid receiver for allowing vapor to return but preventing liquid refrigerant flow from said liquid receiver back to said condenser,
said high pressure section comprising:
fifth conduit means connecting said liquid receiver to said reclaimed refrigerant storage tank,
means for selectively pressurizing said liquid receiver for periodic pumping of reclaimed refrigerant in liquid form from said liquid receiver to said storage tank,
and second check valve means in said fifth conduit means for preventing reverse flow of reclaimed refrigerant from said storage tank back to said liquid receiver.

2. The system as claimed in claim 1, wherein at least said condenser and said liquid receiver are positioned in order at decreasing vertical height such that condensed refrigerant within said condenser can flow by gravity to said liquid receiver for accumulation therein.

3. The system as claimed in claim 2, wherein said slack sided accumulator, said condenser and said liquid receiver are positioned in order, at decreasing vertical height.

4. The system as claimed in claim 1, further comprising a second evaporator coil surrounding said liquid receiver for subcooling said liquid refrigerant accumulating within said liquid receiver from said condenser via said third conduit means, and wherein said second evaporator coil is connected to said conventional refrigeration system commonly with said first evaporator coil.

5. The system as claimed in claim 4, wherein said second evaporator coil is connected in series with said first evaporator coil and upstream thereof via sixth conduit means,
and wherein said sixth conduit means includes a thermal expansion valve upstream of said second evaporator coil having a thermal bulb in contact with said fourth conduit means at the outlet side of said first evaporator coil within said condenser for controlling operation of said thermal expansion valve.

6. The system as claimed in claim 1, wherein said inlet section oil separator is a centrifugal separator including a cylindrical casing forming a separator chamber having a vertically oriented axis, said inlet to said separator chamber opens tangentially to the interior of said cylindrical casing, said second conduit means opens to the top of said inlet separator chamber, and said third conduit means opens to said inlet centrifugal separator chamber above the level of said tangential inlet,
and wherein said separated oil removal means comprises a further conduit means opening to the bottom of said inlet centrifugal separator chamber and extending downwardly thereof and connected to an oil receiver, and said system further comprises a first cut off valve within said further conduit means for controlling oil flow from said oil receiver.

7. The system as claimed in claim 6, further comprising an oil gauge positioned in said further conduit means intermediate of said centrifugal separator and said oil receiver, and a second cut off valve within said further conduit means intermediate of said oil gauge and said oil receiver, for selectively controlling of flow of separated oil from said oil gauge to said oil receiver.

8. The system as claimed in claim 1, further comprising a water separator operatively coupled to said condenser, for separating water condensed within said condenser from liquid refrigerant accumulating within said condenser.

9. The system as claimed in claim 1, wherein said condenser includes a condenser housing surrounding said evaporator coil, said condenser housing including an inclined bottom wall and a water separator well within said inclined bottom wall thereof at a lower end thereof, said well including a vertical baffle plate adjacent one side of the well and having an opening therein adjacent to the bottom of said well, a drain line opening to the bottom of said well remote from said baffle plate for draining separated water from said well and including a cut off valve for selectively controlling removal of accumulated water from said well,
wherein said condenser housing includes a liquid refrigerant discharge port within said housing at a given level within said well to the side of said well remote from said inclined bottom wall,
and wherein said discharge port opens to said fourth conduit means to permit gravity flow of condensed liquid refrigerant from said condenser chamber through said fourth conduit means to said liquid receiver.

10. The system as claimed in claim 1, wherein said means for pressurizing said liquid receiver chamber comprises a piston mounted therein for reciprocation, a power cylinder disposed in proximity to said liquid receiver, a piston within said power cylinder defining first and second chambers on each side thereof, a piston rod coupled at opposite ends to respective pistons and means for selectively supplying a gas under pressure to said first and second chambers of said power cylinder for causing the piston within said power cylinder to be driven longitudinally within said power cylinder and to displace the piston within said liquid receiver for applying pressure to or releasing pressure from the liquid refrigerant within said liquid receiver cylinder to one side of said liquid receiver piston.

11. The system as claimed in claim 10, wherein said means for selectively supplying a gas under pressure to said first and second chambers of said power cylinder comprises;
- a solenoid valve having a cylindrical casing,
- a source of air under pressure, a line for connecting said source to a solenoid valve,
- said solenoid valve cylindrical casing including an axially displaceable valve spool,
- a solenoid coil for displacing said spool axially to a second position in response to energization thereof, biasing means for biasing said spool to a first position in the absence of solenoid coil energization, and passages within said spool for selectively connecting said air supply source to respective sides of said power cylinder chambers via a pair of lines, respectively connecting said solenoid valve to said power cylinder, or for dumping said chambers to the atmosphere.

12. The system as claimed in claim 1, further comprising a level sensing switch, operatively coupled to said reclaimed refrigerant storage tank for sensing the level of liquid refrigerant stored under pressure therein and for shutting down said conventional refrigeration system and for depressurizing the chamber of the liquid receiver in response to accumulation of liquid refrigerant to a predetermined level within said reclaimed refrigerant storage tank.

* * * * *